United States Patent
Zhang et al.

(10) Patent No.: US 10,154,431 B2
(45) Date of Patent: Dec. 11, 2018

(54) CONGESTION MITIGATION BASED ON USER DEVICE AND BASE STATION CONDITION INFORMATION

(71) Applicant: Verizon Patent and Licensing Inc., Arlington, VA (US)

(72) Inventors: Quan Zhang, Pleasant Hill, CA (US); Jude M. Munn, Bay Point, CA (US); Robert Worrall, Annandale, NJ (US); Haim S. Ner, Fair Lawn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 91 days.

(21) Appl. No.: 15/277,621

(22) Filed: Sep. 27, 2016

(65) Prior Publication Data

US 2018/0091999 A1 Mar. 29, 2018

(51) Int. Cl.
*H04W 28/02* (2009.01)
*H04L 12/801* (2013.01)

(52) U.S. Cl.
CPC ......... *H04W 28/0289* (2013.01); *H04L 47/12* (2013.01); *H04W 28/0236* (2013.01)

(58) Field of Classification Search
CPC .................................................. H04W 28/0289
See application file for complete search history.

(56) References Cited

U.S. PATENT DOCUMENTS

| | | | | |
|---|---|---|---|---|
| 8,374,631 B2* | 2/2013 | Kall | ......................... | H04W 8/10 370/328 |
| 8,799,372 B1* | 8/2014 | Upadhyay | ........... | H04L 67/2828 709/204 |
| 9,071,984 B1* | 6/2015 | Vivanco | ............. | H04W 28/0231 |
| 9,655,054 B2* | 5/2017 | HomChaudhuri | .......................... | H04W 52/0274 |
| 9,756,603 B2* | 9/2017 | Patil | ..................... | H04W 68/005 |
| 9,838,325 B2* | 12/2017 | Lee | .......................... | H04L 47/27 |
| 9,860,024 B2* | 1/2018 | Chowdhury | ........... | H04L 1/1812 |
| 9,860,783 B2* | 1/2018 | Lu | ....................... | H04W 28/0252 |
| 9,860,791 B1* | 1/2018 | Fiumano | ................ | H04W 28/12 |
| 2003/0026231 A1* | 2/2003 | Lazaridis | ................ | G06Q 30/00 370/338 |
| 2003/0087629 A1* | 5/2003 | Juitt | .......................... | H04L 1/22 455/411 |
| 2008/0027947 A1* | 1/2008 | Pritchett | ........... | G06F 17/30887 |
| 2009/0240817 A1* | 9/2009 | Meyer | ..................... | H04L 47/10 709/228 |
| 2009/0282155 A1* | 11/2009 | Ali | ....................... | H04W 76/022 709/228 |
| 2010/0211628 A1* | 8/2010 | Shah | ..................... | H04W 48/17 709/203 |

(Continued)

*Primary Examiner* — Parth Patel

(57) ABSTRACT

A device may receive, from a user device and via a base station, a request to access a resource associated with a server device. The device may determine first condition information associated with the user device, and may determine second condition information associated with the base station. The device may determine one or more actions to be performed based on at least one of the first condition information or the second condition information. The device may perform, in association with a first flow or a second flow, the one or more actions. The first flow may be associated with the device and the user device, and the second flow may be associated with the device and the server device.

20 Claims, 7 Drawing Sheets

(56) References Cited

U.S. PATENT DOCUMENTS

| | | | |
|---|---|---|---|
| 2014/0010150 A1* | 1/2014 | Agarwal | H04W 4/02 |
| | | | 370/328 |
| 2014/0113674 A1* | 4/2014 | Joseph | H04W 4/021 |
| | | | 455/519 |
| 2014/0185452 A1* | 7/2014 | Kakadia | H04W 28/12 |
| | | | 370/236 |
| 2014/0304502 A1* | 10/2014 | Su | H04W 4/02 |
| | | | 713/154 |
| 2015/0043332 A1* | 2/2015 | Nylander | H04L 29/06095 |
| | | | 370/229 |
| 2015/0057022 A1* | 2/2015 | Burckart | H04W 4/02 |
| | | | 455/456.3 |
| 2015/0103658 A1* | 4/2015 | Okuno | H04W 28/0289 |
| | | | 370/232 |
| 2015/0146522 A1* | 5/2015 | Lau | H04W 76/027 |
| | | | 370/230 |
| 2016/0105516 A1* | 4/2016 | Ando | H04W 4/027 |
| | | | 709/206 |
| 2016/0183144 A1* | 6/2016 | Vallabhu | H04W 36/0011 |
| | | | 370/331 |
| 2016/0234751 A1* | 8/2016 | Golaup | H04W 36/0072 |
| 2016/0294714 A1* | 10/2016 | Persson | H04L 47/12 |
| 2016/0337902 A1* | 11/2016 | Hahn | H04W 28/08 |
| 2016/0344621 A1* | 11/2016 | Roeland | H04L 45/38 |
| 2017/0070442 A1* | 3/2017 | Snellman | H04L 47/41 |
| 2017/0142074 A1* | 5/2017 | Mihaly | H04L 63/0428 |
| 2017/0163525 A1* | 6/2017 | Fedor | H04L 45/28 |
| 2017/0195231 A1* | 7/2017 | Lopez Serrano | H04L 47/122 |
| 2017/0273126 A1* | 9/2017 | Lim | H04W 36/02 |
| 2017/0289872 A1* | 10/2017 | Xiong | H04W 36/023 |
| 2017/0310601 A1* | 10/2017 | Yu | H04L 47/27 |

\* cited by examiner

CONGESTION MITIGATION BASED ON USER DEVICE AND BASE STATION CONDITION INFORMATION

BACKGROUND

An application layer or transport layer protocol may implement a congestion avoidance algorithm or other flow control mechanism that is based on a network capacity and/or a network loading condition. The congestion avoidance algorithm may be implemented to prevent a link between a server device and a client device from becoming overloaded with network traffic. Additionally, the congestion avoidance algorithm may estimate congestion between the server device and the client device, and may adjust a transmit rate of network traffic based on the estimated congestion.

DETAILED DESCRIPTION OF PREFERRED EMBODIMENTS

Figure 1A:
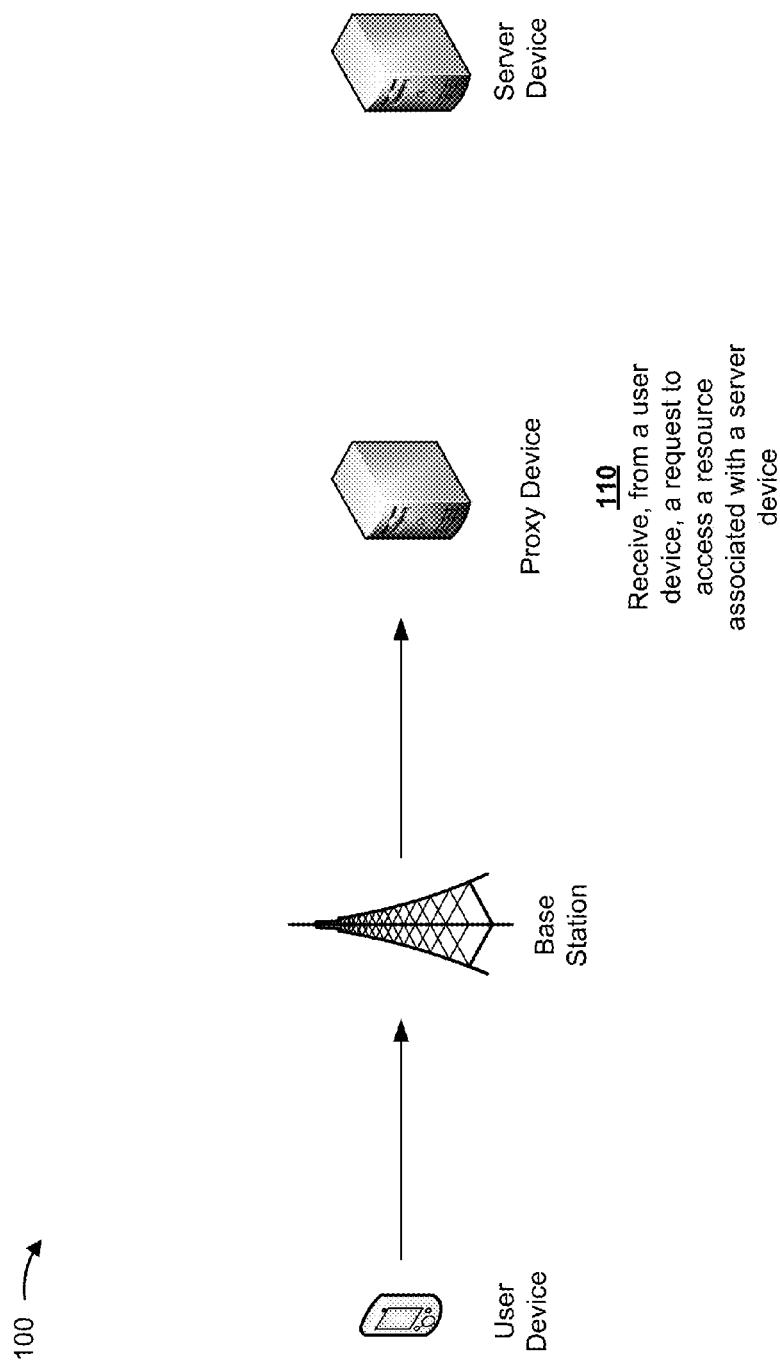
FIGS. 1A-1D are diagrams of an overview of an example implementation described herein.

The following detailed description of example implementations refers to the accompanying drawings. The same reference numbers in different drawings may identify the same or similar elements.

A server device may provide, to a user device, data associated with particular applications and/or services (e.g., Internet services, such as streaming media services, multimedia services, social media services, Internet protocol television (IPTV) services, and/or the like) using particular application layer protocols (e.g., HyperText Transfer Protocol (HTTP), HTTP secure (HTTPs), HTTP Live Streaming (HLS), Dynamic Adaptive Streaming over HTTP (DASH), HTTP Dynamic Streaming, HTTP Adaptive Streaming, Microsoft Smooth Streaming, or the like), and/or transport layer protocols (e.g., transmission control protocol (TCP), stream control transmission protocol (SCTP), user datagram protocol (UDP), quick UDP Internet connections (QUIC), etc.).

In some cases, the application layer protocol and/or the transport layer protocol associated with the application and/or service may implement a congestion detection algorithm to regulate transmission throughput (e.g., to prevent a link between a server device and a client device from becoming overloaded with network traffic or underutilized), or may not implement a congestion detection mechanism. In a wireless network, an inline proxy server may falsely identify radio frequency (RF) link quality degradation as a sign of network congestion and may throttle throughput to a user device (e.g., since link quality degradation may exhibit similar conditions as network congestion). In such cases, a proxy server may reduce a transmit rate to a user device based on erroneously or falsely estimating network congestion based on packet losses and/or oscillating round-trip times (RTTs).

To facilitate wireless communications between a user device and a server device, a proxy server may attempt to improve a connection between the server device and the user device. The proxy server may attempt to improve the connection by estimating congestion based on various input variables associated with a flow (e.g., a sequence of packets associated with a connection), such as RTTs, packet losses, and/or bandwidth estimation values. However, such input variables may inaccurately reflect network conditions. Additionally, a proxy server may not have access to a base station associated with a wireless network (e.g., access to the actual data associated with the user device and/or the base station). Thus, the proxy server may perform standard (e.g., universal) actions in association with a flow. For example, in the case of a TCP flow, the proxy server may perform an action by applying standard TCP parameter values (e.g., congestion window values, receive window values, etc.) to flows which may not accurately correspond to underlying network conditions, thereby resulting in unnecessary congestion mitigation actions.

Implementations described herein enable a proxy device (e.g., a proxy server) to receive, from a user device, a request to access a resource (e.g., content) associated with a server device, cause a first connection to be established with the user device, and cause a second connection to be established with the server device. Additionally, implementations described herein enable the proxy device to receive condition information associated with the user device (e.g., an access distance to a base station, signal quality values, or the like) and condition information associated with the base station (e.g., a congestion level, or the like). Additionally, or alternatively, the proxy device may determine an action to be performed in association with a flow (e.g., a flow associated with the first connection and/or the second connection based on the condition information associated with the user device and/or the base station). Additionally, the proxy device may perform the action in association with the flow (e.g., may set a congestion window value, may adjust a congestion window value and/or a receive window value, may cause another device to perform a handover procedure, may instruct the user device to use particular radio frequency (RF) carriers, or the like). In this way, the proxy device may more accurately estimate conditions associated with the user device, the base station, and/or a radio access network (RAN), and perform actions in association with a flow based on the conditions, thereby improving throughput, increasing efficiency of spectrum utilization, reducing packet losses, reducing download times, increasing the efficiency of a connection, and/or reducing network congestion. Additionally, or alternatively, implementations described herein conserve processor and/or memory resources of the user device, the server device, and/or the proxy device, and/or conserve network resources based on performing an action in association with a flow based on actual congestion data.

Figure 1B:
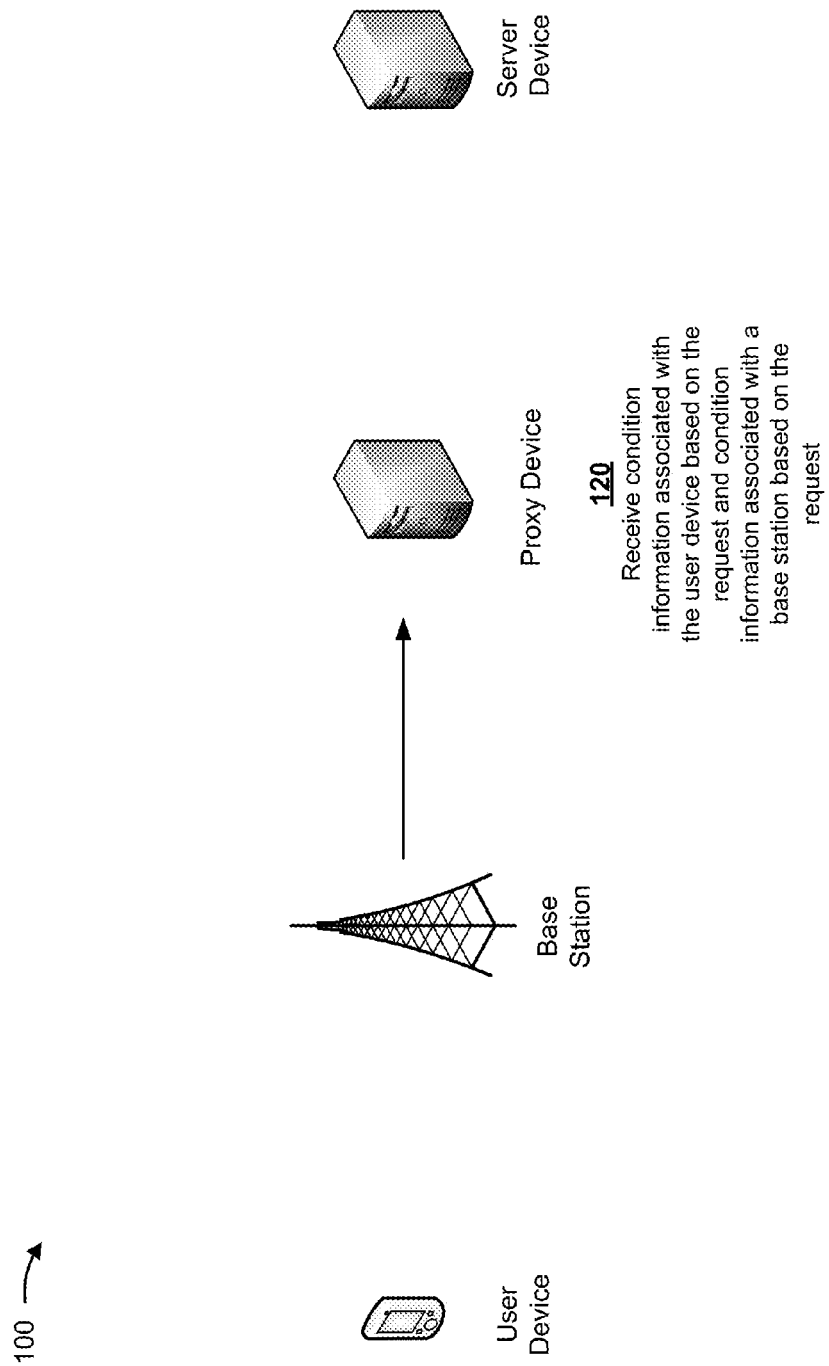

FIGS. 1A-1D are diagrams of an overview of an example implementation 100 described herein. As shown in FIG. 1A, and by reference number 110, a proxy device may receive, from a user device (e.g., via a base station associated with a cellular network), a request to access a resource associated with a server device (e.g., a web page, a web document, a video file, an audio file, an image, etc.). As shown in FIG. 1B, and by reference number 120, the proxy device may receive condition information associated with the user device, and may receive condition information associated with the base station based on the request. In some implementations, the base station may provide the condition information to the proxy device. Additionally, or alternatively, multiple base stations may provide the condition information to the proxy device. For example, condition information may include information associated with one or more network conditions (e.g., an access distance between the user device and the base station, a signal quality value associated with the user device, a congestion level associated with the base station, etc.).

Figure 1C:
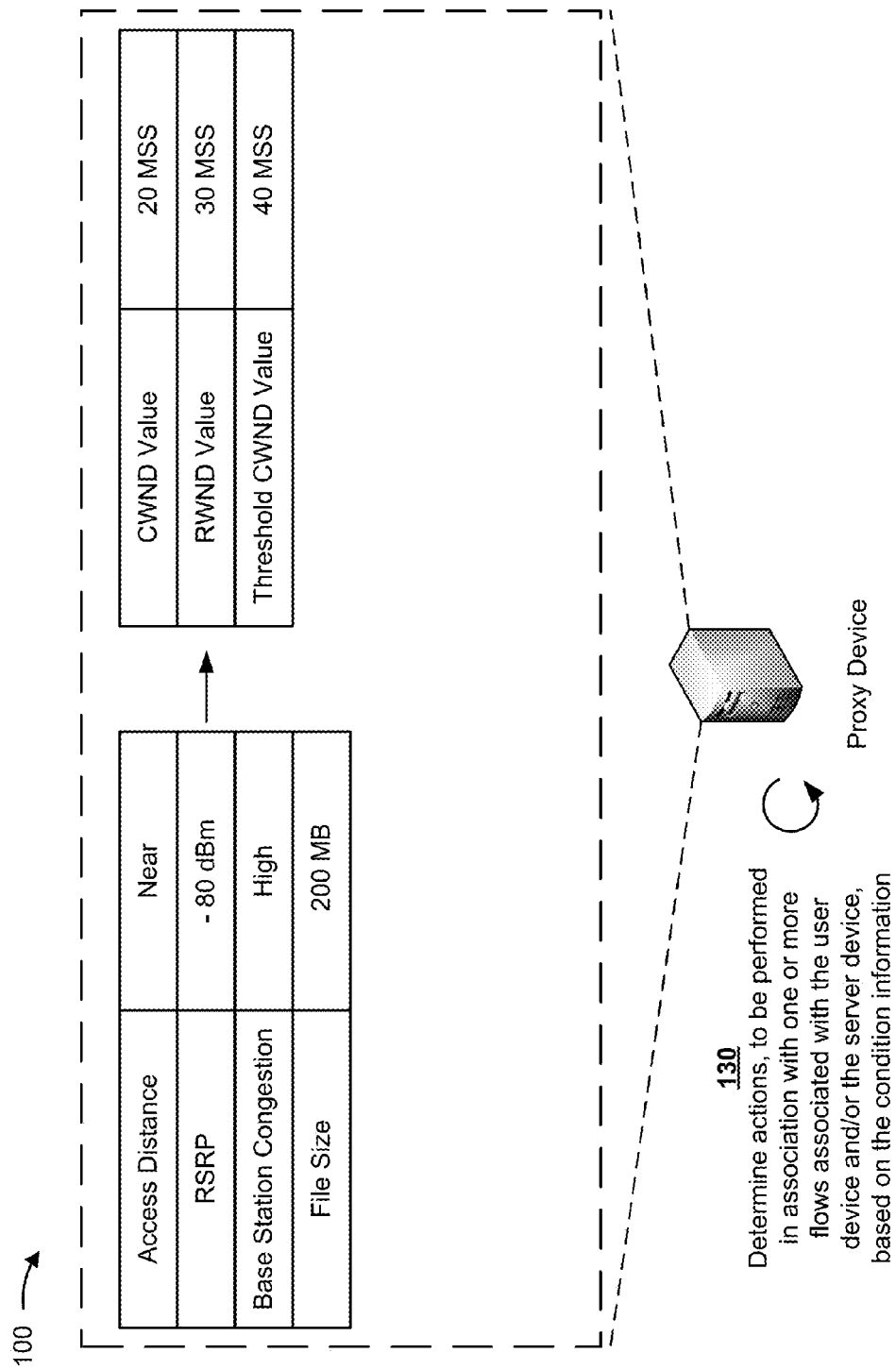

As shown in FIG. 1C, and by reference number 130, the proxy device may determine actions, to be performed in association with one or more flows associated with the user device and/or the server device, based on the condition information. In the example shown in FIG. 1C, the proxy device may map condition information, such as an access distance, a reference signal received power (RSRP) value, base station congestion information, and a file size (e.g., a file size associated with the requested resource) to parameter values that may be applied to flows associated with the user device and/or the server device. For example, assume that the one or more flows are TCP flows. In this case, the proxy device may map condition information to a congestion window (CWND) value, a receive window (RWND) value, a threshold CWND value, or the like (e.g., shown as including multiples of maximum segment size (MSS) values).

Figure 1D:
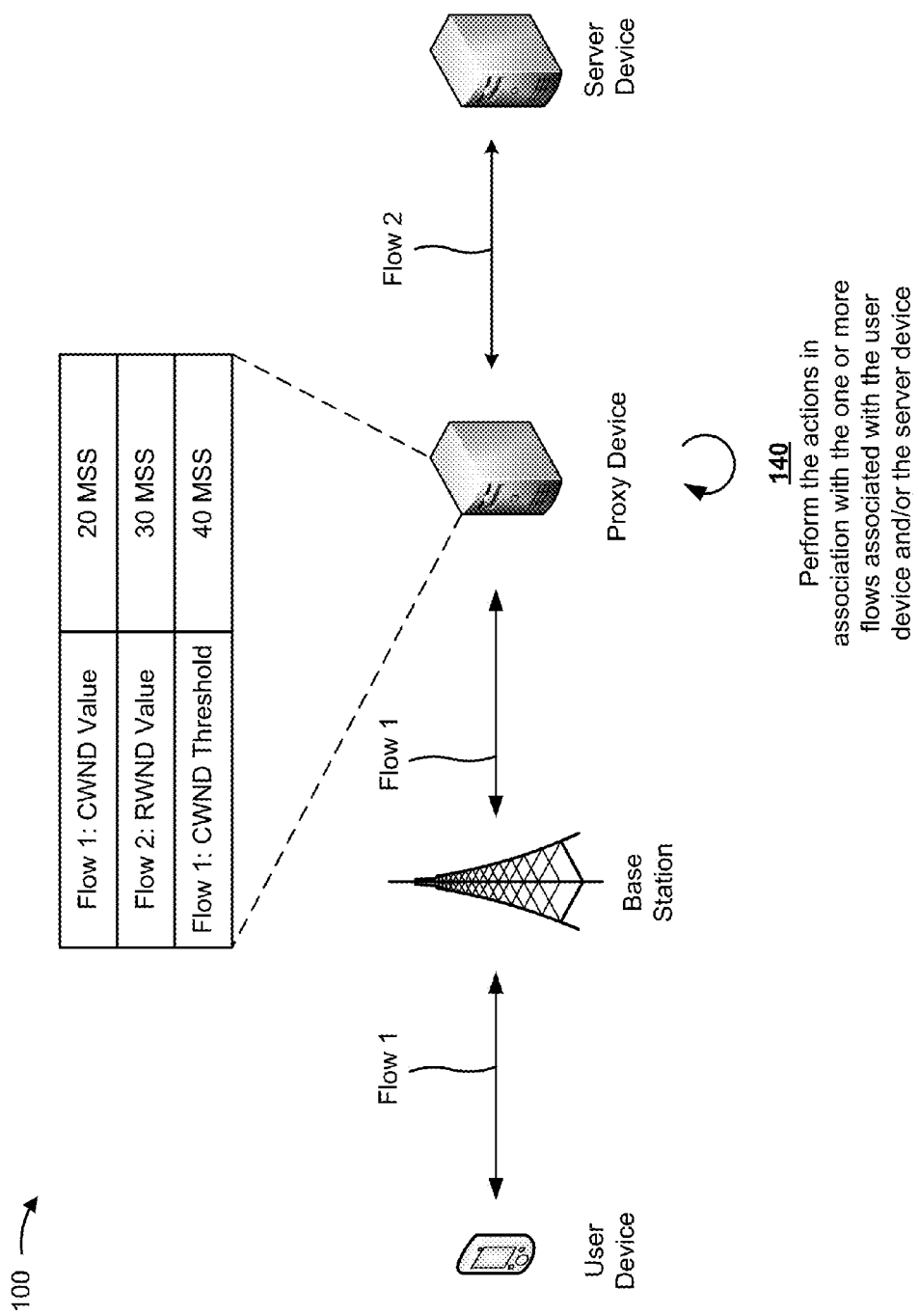

As shown in FIG. 1D, and by reference number 140, the proxy device may perform the actions in association with one or more flows associated with the user device and/or the server device. For example, as shown, the proxy device may perform the actions by applying the parameter values to a first flow (e.g., Flow 1) associated with the user device and the proxy device. Additionally, or alternatively, the proxy device may apply the parameter values to a second flow (e.g., Flow 2) associated with the server device and the proxy device. As described herein, the proxy device may perform the actions (e.g., apply the parameter values to) in association with the one or more flows in order to more accurately regulate transmission throughput (e.g., based on conditions associated with the user device and/or the base station).

In this way, network conditions may be more accurately determined in relation to when condition information is not received and used to determine network conditions. In turn, throughput may be more properly regulated. For example, the proxy device may refrain from throttling throughput when network congestion is not present (e.g., in a situation that mimics the signs of network congestion, such as radio signal degradation or signal weakness in a connection between a user device and a base station).

Implementations described herein enable the proxy device to more accurately estimate conditions associated with the user device, the base station, and/or a radio access network (RAN), and perform actions (e.g., set parameter values, cause a handover to be performed, instruct the user device to use a carrier aggregation technique, etc.) based on the conditions, thereby improving throughput, increasing efficiency of spectrum utilization, reducing packet losses, reducing download times, increasing the efficiency of a connection, and/or reducing network congestion. In this way, implementations described herein may conserve processor and/or memory resources of devices associated with a flow, and may conserve network resources.

While some of the implementations described herein are described in association with TCP connections and/or describe TCP parameter values, it should be understood that implementations described herein may be applicable to other types of connections that implement other application layer and/or transport layer protocols (e.g., UDP connections, QUIC connections, etc.).

As indicated above, FIGS. 1A-1D are provided merely as an example. Other examples are possible and may differ from what was described with regard to FIGS. 1A-1D.

Figure 2:
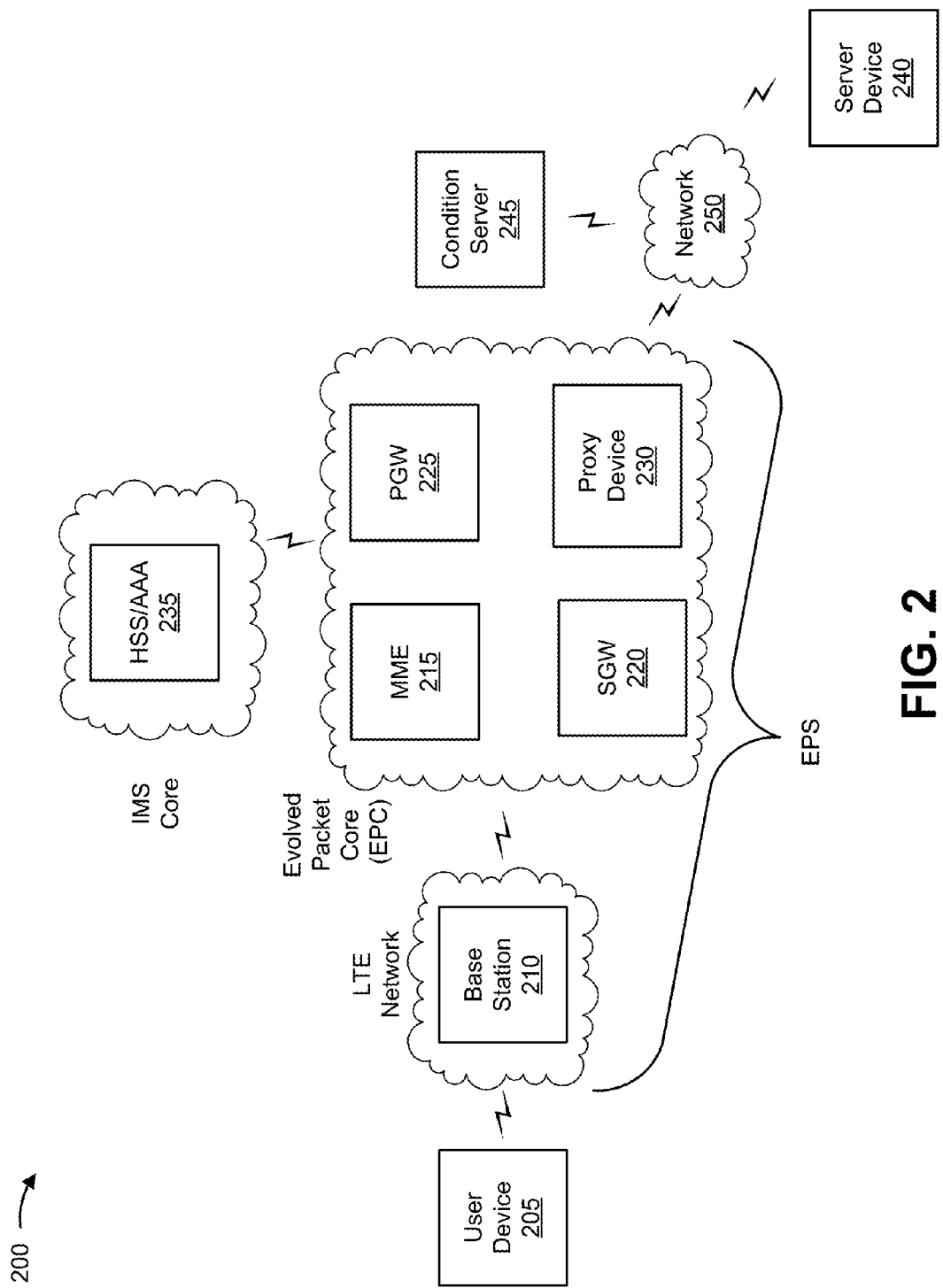
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity device (MME) 215, a serving gateway (SGW) 220, a packet data network gateway (PGW) 225, a proxy device 230, a home subscriber service/authentication, authorization, and accounting server (HSS/AAA) 235, a server device 240, a condition server 245, and a network 250. Devices of environment 200 may interconnect via wired connections, wireless connections, or a combination of wired and wireless connections.

Some implementations are described herein as being performed within a long-term evolution (LTE) network for explanatory purposes. Implementations may be performed within a network that is not an LTE network, such as a satellite network, a Wi-Fi network, a third generation (3G) network, a code division multiple access (CDMA) network, or a next generation network, such as a 5G network.

Environment 200 may include an evolved packet system (EPS) that includes an LTE network and/or an evolved packet core (EPC) that operate based on a 3GPP wireless communication standard. The LTE network may include a radio access network (RAN) that includes one or more base stations 210 that take the form of evolved Node Bs (eNBs) via which user device 205 communicates with the EPC. The EPC may include MME 215, SGW 220, PGW 225, and/or proxy device 230 that enable user device 205 to communicate with network 250 and/or an Internet protocol (IP) multimedia subsystem (IMS) core. The IMS core may include HSS/AAA 235, and may manage device registration and authentication, session initiation, etc., associated with user devices 205. HSS/AAA 235 may reside in the EPC and/or the IMS core.

User device 205 includes one or more devices capable of connecting to a network via base station 210. For example, user device 205 may include a communication device, such as a mobile phone (e.g., a smart phone or a radiotelephone) a tablet computer, a wearable communication device (e.g., a smart wristwatch or a pair of smart eyeglasses), or a similar type of device. User device 205 may send traffic to and/or receive traffic from network 250 via base station 210 (e.g., based on a radio access bearer between user device 205 and SGW 220).

Base station 210 includes one or more devices capable of transferring traffic, such as audio, video, text, and/or other traffic, destined for and/or received from user device 205. In some implementations, base station 210 may include an eNB associated with the LTE network that receives traffic from and/or sends traffic to network 250 via SGW 220 and/or PGW 225. Additionally, or alternatively, one or more base stations 210 may be associated with a RAN that is not associated with an LTE network. Base station 210 may send traffic to and/or receive traffic from user device 205 via an air interface (e.g., a radio frequency (RF) signal). In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 220 may aggregate traffic received from one or more base stations 210 associated with the LTE network, and may send the aggregated traffic to network 250 (e.g., via PGW 225) and/or other network devices associated with the EPC and/or the IMS core. Additionally, or alternatively, SGW 220 may receive traffic from network 250 and/or other network devices, and may send the received traffic to user device 205 via base station 210. Additionally, or alternatively, SGW 220 may perform operations associated with handing off user device 205 to and/or from an LTE network.

PGW 225 includes one or more devices capable of providing connectivity for user device 205 to external packet data networks (e.g., other than the depicted EPC and/or LTE network), such as network 250. For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 250. Additionally, or alternatively, PGW 225 may receive traffic from network 250, and may send the traffic to user device 205 via SGW 220 and base station 210. PGW 225 may record data usage information (e.g., byte usage), and may provide the data usage information to HSS/AAA 235.

Proxy device 230 includes one or more devices capable of receiving, storing, processing, controlling, and/or providing information associated with a flow. For example, proxy device 230 may include a server device (e.g., a proxy server), a cloud computing device, or a similar device. In some implementations, proxy device 230 may receive traffic from server device 240 (e.g., via network 250) and may provide the traffic to user device 205 (e.g., via base station 210) and/or may receive traffic from user device 205 (e.g., via base station 210) and may provide the traffic to server device 240 (e.g., via network 250).

HSS/AAA 235 includes one or more devices, such as one or more server devices, capable of managing (e.g., receiving, generating, storing, processing, and/or providing) information associated with user device 205. For example, HSS/AAA 235 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), information that identifies whether user device 205 is associated with an RF access signaling usage control policy and/or an RF access signaling usage billing policy, and/or similar information. HSS/AAA 235 may provide this information to one or more other devices of environment 200 to support the operations performed by those devices.

Additionally, or alternatively, HSS/AAA 235 and/or a policy charging and rules function (PCRF) server device may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, RF access signaling usage restrictions, etc.), may track resources consumed by user device 205 (e.g., a quantity of voice minutes consumed, a quantity of data consumed, a quantity of RF signals transmitted, a quantity of radio access bearers requested and/or established, etc.), and/or may perform similar operations.

Server device 240 includes one or more devices capable of providing content. For example, server device 240 may include a server device (e.g., a host server, a web server, an application server, etc.), a cloud computing device, or a similar device. For example, server device 240 may provide video, audio, images, webpages, text, data, and/or some combination thereof.

Condition server 245 includes one or more devices capable of providing condition information. For example, condition server 245 may include a server device (e.g., a host server, a web server, an application server, etc.), a cloud computing device, or a similar device. For example, condition server 245 may provide, to proxy device 230, condition information associated with user device 205, base station 210, and/or MME 215.

Network 250 includes one or more wired and/or wireless networks. For example, network 280 may include a cellular network (e.g., an LTE network, a 5G network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a satellite network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
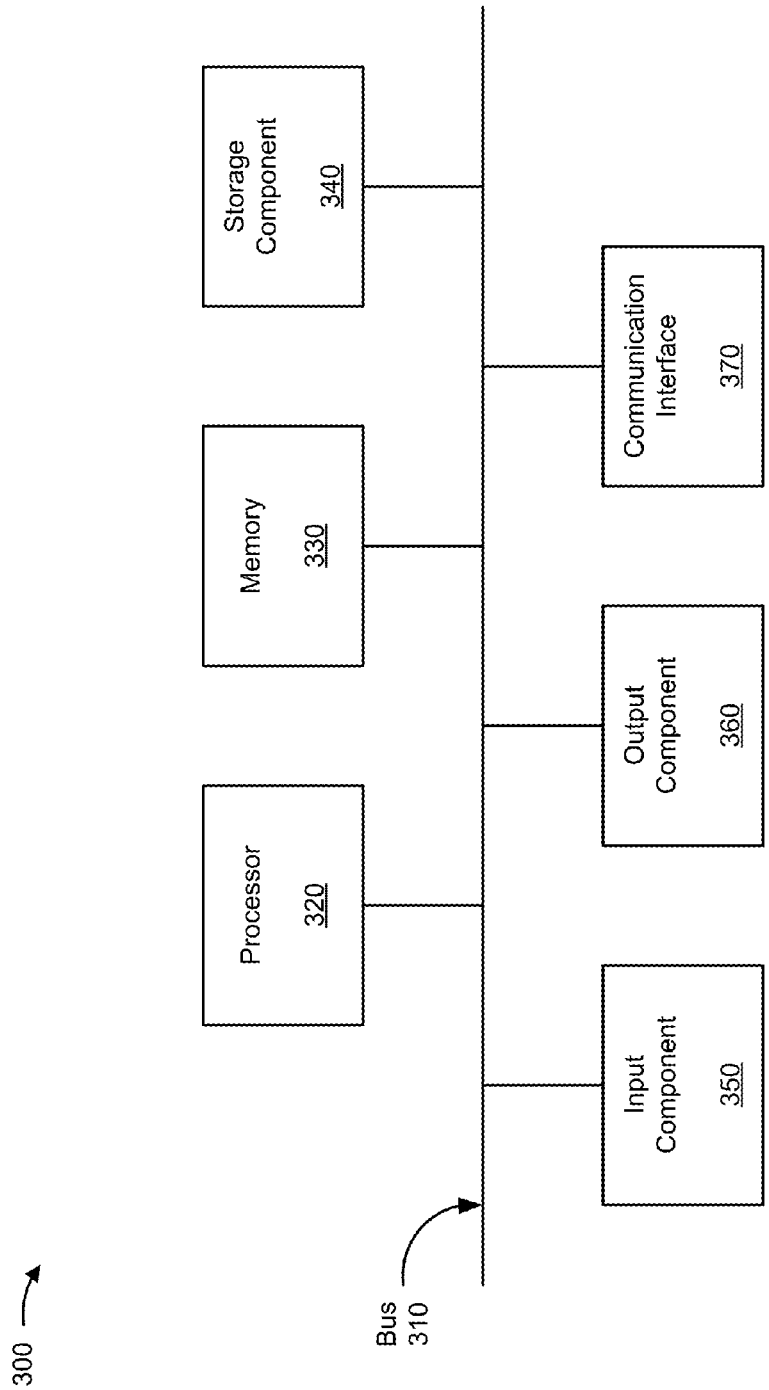
FIG. 3 is a diagram of example components of one or more devices of FIG. 2.

FIG. 3 is a diagram of example components of a device 300. Device 300 may correspond to user device 205, base station 210, MME 215, SGW 220, PGW 225, proxy device 230, HSS/AAA 235, server device 240, and/or condition server 245. In some implementations, user device 205, base station 210, MME 215, SGW 220, PGW 225, proxy device 230, HSS/AAA 235, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
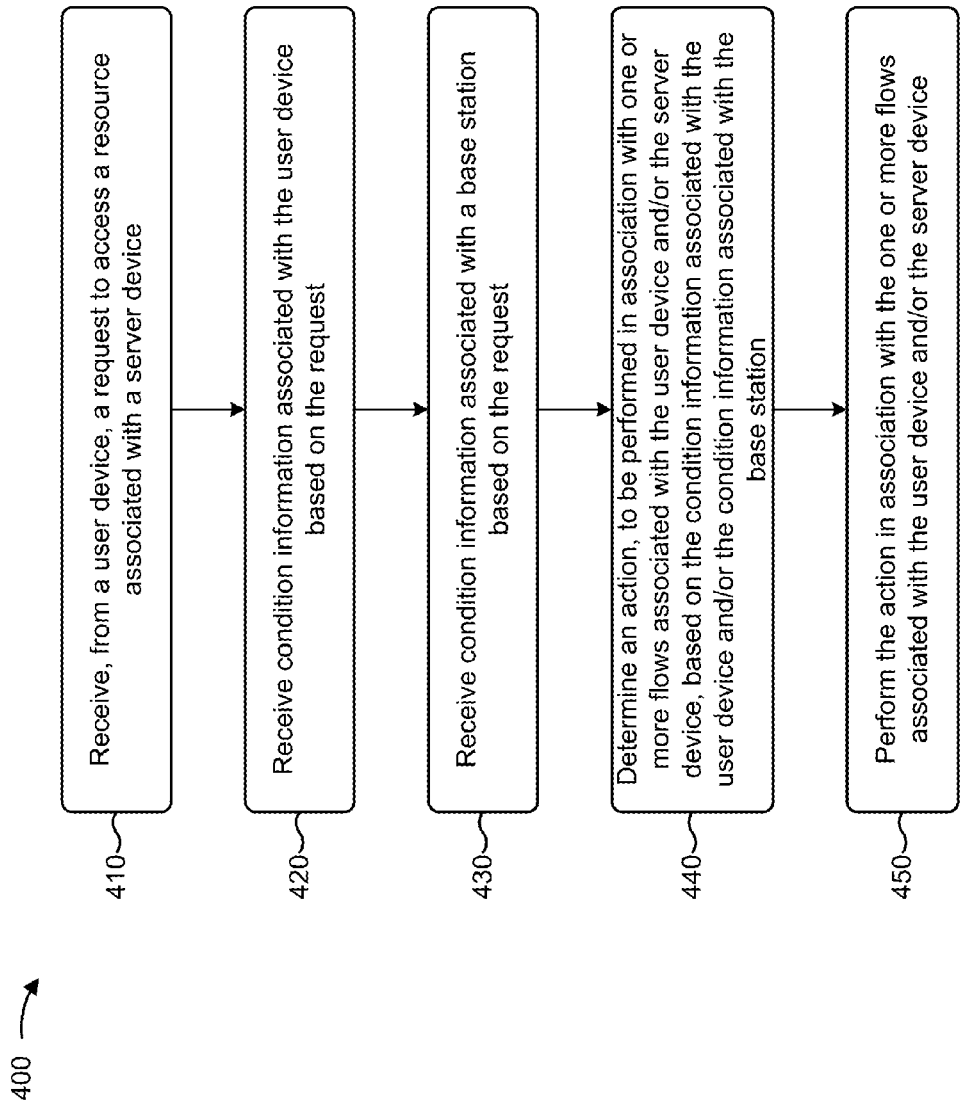
FIG. 4 is a flow chart of an example process for providing congestion mitigation assistance based on user device and/or base station condition information.

FIG. 4 is a flow chart of an example process 400 for providing congestion mitigation assistance based on user device and/or base station condition information. In some implementations, one or more process blocks of FIG. 4 may be performed by proxy device 230. In some implementations, one or more process blocks of FIG. 4 may be performed by another device or a group of devices separate from or including proxy device 230, such as user device 205, base station 210, MME 215, SGW 220, PGW 225, HSS/AAA 235, server device 240, and/or condition server 245.

As shown in FIG. 4, process 400 may include receiving, from a user device, a request to access a resource associated with a server device (block 410). For example, proxy device 230 may receive, from user device 205, a request to access a resource associated with server device 240. As described herein, a resource may include a web page, a web document, content (e.g., streaming media content, an image, a video file, an audio file, etc.), or the like. For example, the request may include a resource identifier (e.g., a uniform resource locator (URL), a uniform resource identifier (URI), or the like). In some implementations, proxy device 230 may identify the resource and/or server device 240 based on the resource identifier. In some implementations, proxy device 230 may receive, from server device 240 and/or user device 205, information that identifies a file size (e.g., a quantity of bytes) associated with the resource based on the request, based on the resource identifier, or the like.

In some implementations, proxy device 230 may cause a first connection to be established with user device 205 and a second connection to be established with server device 240 based on the request. In some implementations, proxy device 230 may cause the second connection to be independently established (e.g., independently of the first connection). In this way, proxy device 230 may separately control a rate of traffic transmission between proxy device 230 and user device 205, and/or between proxy device 230 and server device 240, as described elsewhere herein. In some implementations, the first connection and the second connection may be associated with particular application layer protocols (e.g., HTTP, SCTP, etc.) and transport layer protocols (e.g., TCP, UDP, QUIC, etc.). In some implementations, the first connection may be associated with a first flow, and the second connection may be associated with a second flow. As described herein, a flow may include a sequence of packets associated with a connection. As used herein, a packet may refer to a communication structure for communicating information, such as a protocol data unit (PDU), a packet, a frame, a datagram, a segment, a message, a block, a cell, a subframe, a slot, a symbol, a portion of any of the above, and/or another type of formatted or unformatted unit of data capable of being transmitted via a network. In this way, proxy device 230 may cause connections to be established with user device 205 and server device 240, and may determine an action to be performed in association with one or more flows associated with the connections, as described elsewhere herein.

As further shown in FIG. 4, process 400 may include receiving condition information associated with the user device based on the request (block 420). For example, proxy device 230 may receive condition information associated with user device 205 based on the request. In some implementations, base station 210 may provide the condition information to proxy device 230. Additionally, or alternatively, multiple base stations 210 may provide the condition information to proxy device 230. Additionally, or alternatively, user device 205 (e.g., a client application executed by user device 205) may provide, to base station 210 and/or proxy device 230, the condition information based on the request.

In some implementations, the condition information may include an access distance. For example, an access distance may refer to a distance (e.g., a geographic distance) of user device 205 to base station 210, a position of user device 205 in relation to base station 210, or the like. In some implementations, base station 210 and/or base stations 210 may determine an access distance of user device 205 to base station 210 based on performing a technique (e.g., a triangulation technique, a multilateration technique, or the like). For example, base station 210 and/or base stations 210 may receive wireless signals (e.g., reference signals, data signals, or the like) from user device 205, and may determine an access distance based on the wireless signals. In some implementations, base station 210 may determine an access distance of user device 205 to base station 210 based on RTT values, angle of arrival (AOA) values, observed time difference of arrival (OTDOA) values, signal quality values (e.g., RSRP values, etc.), or the like. Additionally, or alternatively, user device 205 may receive wireless signals from base station 210 and/or base stations 210, and may determine an access distance to a particular base station 210 or base stations 210 based on the signals. For example, user device 205 may determine an access distance (e.g., based on AOA values, OTDOA values, signal quality values, or the like), and may provide, to base station 210, information that identifies the access distance.

In some implementations, the condition information may include a signal quality value. For example, a signal quality value may include an RSRP value, a received signal code power (RSCP) value, a received signal strength indicator (RSSI) value, a reference signal received quality (RSRQ) value, a block error rate (BLER) value, a signal-to-interference-plus-noise ratio (SINR) value, a path loss value (e.g., an uplink path loss value or a downlink path loss value), or the like. For example, user device 205 may receive wireless signals from base station 210, and may determine signal quality values based on the wireless signals. Additionally, or alternatively, user device 205 may provide, to base station 210, information that identifies the signal quality values (e.g., based on performing a measurement reporting procedure). Additionally, or alternatively, base station 210 may receive wireless signals from user device 205, and may determine signal quality values associated with the wireless signals (e.g., RSSI values, RSRP values, etc.).

In some implementations, the condition information may include information associated with the resource (e.g., information regarding the resource requested by user device 205). For example, the condition information may include information identifying a file size associated with the resource (e.g., a quantity of bytes associated with the resource). In some implementations, the resource information may identify a requested file size (e.g., a total quantity of bytes associated with the request), a received file size (a quantity of bytes user device 205 has already received), an outstanding file size (a quantity of bytes user device 205 has not received), a retransmission quantity (e.g., a quantity of bytes that have been retransmitted), or the like. Additionally, or alternatively, the resource information may also include information identifying a type of resource (e.g., a webpage, streaming media content, or the like).

In some implementations, the condition information may include location information associated with user device 205. For example, the location information may include information that identifies a geographic location of user device 205 (e.g., based on GPS coordinates), an area (e.g., a geographical area) associated with user device 205, or the like.

In some implementations, a condition (e.g., an access distance, a signal quality value, etc.) may include a value, a range of values, a designation, or the like. For example, a particular condition (e.g., an access distance) may be associated with a particular value (e.g., 0.5 kilometers, 0.2 kilometers, 0.1 kilometers, etc.), a range of values (e.g., 0.25-0.5 kilometers, 0.5-0.75 kilometers, 1-2 kilometers, etc.), a designation (e.g., "near," "far," "low," "medium," "high," etc.), or the like.

In some implementations, proxy device 230 may receive the condition information associated with user device 205 based on user device 205 requesting the resource. For example, base station 210 may provide, to proxy device 230, the condition information based on user device 205 requesting the resource. Additionally, or alternatively, proxy device 230 may request the condition information (e.g., when a request for the resource is made). In some implementations, proxy device 230 may receive the condition information based on a time frame. For example, base station 210 may provide the condition information at an interval (e.g., every thirty seconds, every minute, every five minutes, etc.). Additionally, or alternatively, proxy device 230 may request the condition information and receive the condition information based on requesting the condition information.

In some implementations, user device 205 and/or base station 210 may provide, to proxy device 230, the condition information based on an IP/TCP connection. For example, user device 205 and/or base station 210 may implement the explicit congestion notification (ECN) protocol, and may provide condition information based on the IP/TCP stack. In some implementations, user device 205 may set one or more flags (e.g., control bits) in a TCP or IP header (e.g., a congestion window reduced (CWR) flag, an ECN-echo (ECE) flag, an ECN capable (ECT) flag, a congestion encountered (CE) flag, or the like). Additionally, or alternatively, proxy device 230 may determine the condition information based on the one or more flags in the TCP or IP headers.

Additionally, or alternatively, base station 210 may provide, to proxy device 230, the condition information via the S1-U interface based on the general packet radio service tunneling protocol (GTP-U). Additionally, or alternatively, MME 215 may provide, to proxy device 230, the condition information via an S1-MME interface derivative (e.g., a subset interface of the S1-MME interface), via an S11-MME interface derivative (e.g., a subset interface of the S11 interface), or the like.

Additionally, or alternatively, proxy device 230 may provide, to condition server 245, a request for condition information, and may receive the condition information based on the request. In some implementations, base station 210 and/or MME 215 may provide, to condition server 245, the condition information (e.g., based on a time frame, such as every five minutes, every ten minutes, etc.). Additionally, or alternatively, proxy device 230 may request the condition information from condition server 245 based on a time frame.

In some implementations, proxy device 230 may store (e.g., in a data structure, such as lookup table) the condition information associated with user device 205. For example, proxy device 230 may correlate the condition information associated with user device 205 and a device identifier associated with user device 205 (e.g., a mobile directory number (MDN), an international mobile subscriber identity (IMSI), etc.). In this way, proxy device 230 may determine actions to be performed in association with one or more flows associated with user device 205, as described elsewhere herein. As a result, more accurate determination of network conditions, associated with user device 205, may be achieved in relation to when network conditions are interpreted based on connection performance alone, thereby leading to increased throughput, reduced packet losses, reduced latency, etc.

As further shown in FIG. 4, process 400 may include receiving condition information associated with a base station based on the request (block 430). For example, proxy device 230 may receive condition information associated with base station 210, that user device 205 is accessing, based on the request. In some implementations, the condition information associated with base station 210 may include information identifying a congestion level of base station 210. For example, a congestion level may be based on a measurable network resource associated with base station 210 and/or a RAN associated with base station 210. For example, the measurable network resource may include a quantity of allocated bearers, a quantity of user devices 205 connected to a RAN, associated with base station 210, and/or in communication with base station 210 (e.g., a quantity of radio resource control (RRC) connections), a physical resource block utilization, a bandwidth capacity, a throughput rate, a carrier frequency, a carrier spectrum, an RF carrier utilization, or the like.

In some implementations, the condition information may include information associated with the flow with user device 205. For example, the condition information may include a bandwidth value, a throughput value, a goodput value, a jitter value, a latency value, a quantity of packet losses, a delay value, an RTT value, a quantity of retransmissions, or the like. In some implementations, a condition, of the condition information, may be associated with a value, a range of values, a designation, or the like (e.g., as similar as described above in connection with block 420).

In some implementations, proxy device 230 may receive, from base station 210, the condition information associated with base station 210. In some implementations, proxy device 230 may receive the information based on the request, by user device 205, to access the resource associated with server device 240. For example, base station 210 may provide the condition information associated with base station 210 when user device 205 requests the resource. Additionally, or alternatively, proxy device 230 may request the condition information (e.g., when user device 205 requests the resource and/or at another time). Additionally, or alternatively, base station 210 may provide the condition information based on a time frame (e.g., at an interval). Additionally, or alternatively, base station 210 may provide condition information associated with base station 210 based on providing condition information associated with user device 205. For example, base station 210 may provide the condition information associated with base station 210 and the condition information associated with user device 205 contemporaneously, or the like.

In some implementations, proxy device 230 may receive condition information associated with the particular base station 210 that user device 205 is accessing (e.g., the base station 210 that has allocated a resource to user device 205). Additionally, or alternatively, proxy device 230 may receive condition information associated with other base stations 210 (e.g., base stations 210 associated with neighboring cells and/or sectors, or the like).

In some implementations, proxy device 230 may receive the condition information associated with base station 210 in a similar manner as described above in connection with block 430 (e.g., from user device 205, base station 210, MME 215, and/or condition server 245 via IP/TCP signaling, via the S1-U interface, via the S1-MME interface derivative, via the S11-MME interface derivative, or the like).

In some implementations, proxy device 230 may store (e.g., in a data structure) the condition information associated with base station 210. Additionally, or alternatively, proxy device 230 may correlate the condition information associated with base station 210 with the condition information associated with user device 205 (e.g., based on a device identifier of user device 205). In this way, proxy device 230 may more accurately determine, using the information associated with base station 210, parameter values to be applied to one or more flows associated with user device 205 and/or server device 240, as described elsewhere herein. For example, proxy device 230 may determine whether user device 205 and/or base station 210 are associated with particular conditions (e.g., that may introduce communication issues, such as low throughput, packet losses, or the like).

In this way, proxy device 230 may provide network traffic to user device 205 based on conditions associated with user device 205 and/or base stations 210, thereby conserving processor and/or memory resources of user device 205 by reducing communication issues (e.g., low throughput, radio link failure, packet losses, etc.), and/or conserving network resources.

As further shown in FIG. 4, process 400 may include determining an action, to be performed in association with one or more flows associated with the user device and/or the server device, based on the condition information associated with the user device and/or based on the condition information associated with the base station (block 440). For example, proxy device 230 may determine an action, to be performed in association with a first flow between proxy device 230 and user device 205 and/or a second flow between proxy device 230 and server device 240, based on the condition information associated with user device 205 and/or base station 210.

In some implementations, the action may include applying and/or adjusting a parameter value associated with the first flow and/or the second flow. For example, proxy device 230 may determine one or more parameter values to be applied to the first flow and/or the second flow. For example, a parameter value may include a transmit rate associated with proxy device 230 (e.g., a rate of transmission of traffic from proxy device 230 to user device 205), may include a transmit rate associated with server device 240 (e.g., a rate of transmission of traffic from server device 240 to proxy device 230), or the like.

In some implementations, the first flow and/or the second flow may be associated with respective TCP connections. Additionally, or alternatively, the parameter value may include a CWND value, which may represent a quantity of unacknowledged traffic provided to user device 205. In some implementations, proxy device 230 may determine an initial CWND value (e.g., to be applied at the start of a connection), a CWND value associated with a fast recovery state (e.g., to be applied based on detecting a packet loss, a threshold quantity of packet losses, a retransmission time out, or the like), an amount by which to adjust CWND values (e.g., based on performing a slow-start process, based on receiving acknowledgment (ACK) messages, or the like), or the like, as described elsewhere herein.

In some implementations, the parameter value may include a congestion window threshold value, which may represent a maximum quantity of unacknowledged traffic that may be provided to user device 205. Additionally, or alternatively, the parameter value may include a receive window (RWND) value, which may represent a quantity of traffic that proxy device 230 may receive from server device 240 without sending ACK messages to server device 240. Additionally, or alternatively, the parameter value may include a quantity of packet losses that may be detected before entering a fast recovery state (e.g., a threshold quantity of packet losses, or the like). Additionally, or alternatively, the parameter value may include a quantity of packets to store in an application buffer (e.g., a quantity value, a ratio of packets in a send buffer to a receive buffer, etc.), as described elsewhere herein.

In some implementations, proxy device 230 may determine one or more parameter values to apply to a flow between proxy device 230 and user device 205. In some implementations, proxy device 230 may determine a parameter value based on a condition (e.g., a condition associated with user device 205 and/or a condition associated with base station 210). For example, proxy device 230 may determine a parameter value based on a condition (e.g., a value, a range of values, a designation, or the like) satisfying a threshold. In some implementations, proxy device 230 may determine that a condition satisfies a threshold and may determine a parameter value that maps to the condition satisfying the threshold. As an example, proxy device 230 may determine that a particular condition (e.g., an access distance) satisfies a threshold (e.g., 0.5 kilometers), and may determine a particular parameter value (e.g., a CWND value) based on the particular condition satisfying the threshold. In some implementations, proxy device 230 may store information that maps conditions to parameter values, and may determine the parameter values based on the stored information.

Additionally, or alternatively, proxy device 230 may determine a quantity of conditions that satisfy thresholds, may determine that the quantity satisfies a threshold, and may determine a parameter value based on the quantity satisfying the threshold. Additionally, or alternatively, proxy device 230 may determine a particular set of conditions that satisfy thresholds, a particular combination of conditions, and may determine a parameter value based on the particular set of conditions, the particular combination, or the like.

Additionally, or alternatively, proxy device 230 may assign weight values to particular conditions, and may determine a parameter value based on the weight values (e.g., proxy device 230 may determine an overall value based on the weight values). Additionally, or alternatively, proxy device 230 may determine a parameter value based on a geographic location associated with base station 210 and/or user device 205. For example, proxy device 230 may determine a first parameter value for a first geographic location and may determine a second parameter value, that is different than the first parameter value, for a second geographic location.

Additionally, or alternatively, proxy device 230 may determine a parameter value based on a time frame (e.g., a time of day, a day of the week, a month, a season, etc.). In some implementations, proxy device 230 may receive additional condition information associated with user device 205 and/or condition information associated with base station 210 and may determine additional parameter values. Additionally, or alternatively, proxy device 230 may determine a parameter value based on a type of resource (e.g., may determine a particular CWND value for a particular type of resource, such as streaming media content, or the like).

In some implementations, proxy device 230 may determine a parameter value based on one or more techniques (e.g., algorithms, machine learning, computational statistics, artificial intelligence, etc.). For example, proxy device 230 may implement a technique that associates condition information and parameter values. In some implementations, the technique may receive, as input, information identifying known condition information and known parameter values, and may correlate the known condition information and the known parameter values (e.g., using machine learning, computational statistics, artificial intelligence, or the like). Additionally, or alternatively, proxy device 230 may receive condition information and parameter values to be used in association with the technique (e.g., to train a model, or the like). In this way, proxy device 230 may determine parameter values based on the technique (e.g., using the model).

In this way, network conditions may be more accurately determined in relation to when parameter values are not determined based on condition information, thereby conserving processor and/or memory resources of user device 205, base station 210, proxy device 230, and/or server device 240.

In some implementations, proxy device 230 may determine one or more parameter values associated with a flow between proxy device 230 and user device 205 (e.g., a first flow). Additionally, or alternatively, proxy device 230 may determine one or more parameter values associated with a flow between proxy device 230 and server device 240 (e.g., a second flow). In some implementations, proxy device 230 may determine one or more parameter values associated with a flow between proxy device 230 and server device 240 based on a parameter value associated with the flow between proxy device 230 and user device 205. For example, proxy device 230 may determine an RWND value, to be applied to the flow between proxy device 230 and server device 240, based on a CWND value of proxy device 230.

In some implementations, proxy device 230 may determine a profile for user device 205. For example, a profile may include a set of settings (e.g., parameter values) that may be applied to the first flow and/or the second flow. In some implementations, proxy device 230 may correlate a profile with a device identifier of user device 205. In some implementations, proxy device 230 may receive, from user device 205, additional requests for resources, and may determine parameter values to be applied to a flow based on the profile (e.g., based on performing a lookup in a data structure). For example, proxy device 230 may determine a device identifier of user device 205, and may identify a profile, to be applied to a flow, based on the device identifier. In some implementations, proxy device 230 may select a particular profile (e.g., that includes a particular set of settings) based on the condition information associated with user device 205 and/or the condition information associated with base station 210. For example, particular conditions, combinations of conditions, etc., may map to a particular profile. In this case, proxy device 230 may apply the profile (e.g., a set of parameter values associated with the profile) to a flow based on the mapping. Additionally, or alternatively, proxy device 230 may select a particular profile based implementing a technique (e.g., a model).

In some implementations, the action may include providing an instruction regarding a handover procedure. For example, proxy device 230 may provide, to MME 215, an instruction to perform a handover procedure. In some implementations, MME 215 may perform operations associated with handing off user device 205 from a first base station 210 to a second base station 210. In some implementations, proxy device 230 may determine, based on condition information associated with a first base station 210 and condition information associated with a second base station 210, that user device 205 should be handed off to the second base station 210. As an example, assume that a congestion level associated with the first base station 210 (e.g., that user device 205 is accessing) satisfies a congestion level associated with the second base station 210 (e.g., the second base station 210 is less congested). In this case, proxy device 230 may determine that user device should be handed off to the second base station 210.

In some implementations, the action may include providing, to user device 205, an instruction to use particular RF carriers (e.g., perform a carrier aggregation technique). For example, proxy device 230 may determine congestion levels associated with particular RF carriers (e.g., component carriers (CCs)), and may determine particular RF carriers for which user device 205 should use in association with the first flow.

In this way, proxy device 230 may determine an action to be performed in association with the first flow and/or the second flow based on condition information, and may perform the action, as described below.

As further shown in FIG. 4, process 400 may include performing the action in association with the one or more flows associated with the user device and/or the server device (block 450). For example, proxy device 230 may perform the action in association with the first flow and/or the second flow. In some implementations, proxy device 230 may perform the action based on adjusting a transmit rate associated with the first flow. For example, proxy device 230 may adjust (e.g., increase, decrease, etc.) the transmit rate of traffic to user device 205 based on the condition information. Additionally, or alternatively, proxy device 230 may perform the action based on adjusting a transmit rate associated with the second flow (e.g., may instruct server device 240 to adjust a transmit rate based on the condition information).

In some implementations, proxy device 230 may perform the action based on adjusting a parameter value associated with the first flow and/or the second flow. For example, proxy device 230 may apply a CWND value to the first flow (e.g., in implementations that include a TCP connection). For example, proxy device 230 may include an initial CWND value (e.g., a multiple of a maximum segment size (MSS)). In some implementations, proxy device 230 may include a particular initial CWND value (e.g., 10 MSS, 20 MSS, etc.), and may increase (e.g., double, triple, etc.) the initial CWND value based on receiving respective ACK messages from user device 205 (e.g., may perform a "slow-start" process). In this way, proxy device 230 may include an actual CWND value that may vary based on a duration associated with the first flow.

In some implementations, proxy device 230 may determine a CWND value based on comparing an actual CWND value with a threshold CWND value. For example, proxy device 230 may determine a CWND value based on determining a minimum of an actual CWND value and a threshold CWND value. In some implementations, proxy device 230 may adjust a transmit rate based on the CWND value. In this way, proxy device 230 may provide, to user device 205, traffic associated with the first flow based on a parameter value (e.g., a congestion window value, a threshold CWND value, etc.) that was determined based on condition information.

In some implementations, proxy device 230 may implement a fast recovery state. In some implementations, proxy device 230 may detect a packet loss associated with the first flow, and may enter a fast recovery state. For example, proxy device 230 may detect a packet loss (e.g., based on an unacknowledged packet) and may set a CWND value to a percentage of the threshold CWND value (e.g., $2/3$, $1/3$, $2/5$, etc.) based on detecting the packet loss, a threshold quantity of packet losses, or the like.

Additionally, or alternatively, proxy device 230 may perform a slow-start process (e.g., double the CWND value based on receiving an ACK message) after setting the CWND value to the percentage of the threshold CWND value. In this way, proxy device 230 may limit a transmit rate based on detecting a packet loss, thereby preventing additional packet losses. In this way, proxy device 230 may conserve processor and/or memory resources of base station 210 and/or user device 205. Additionally, proxy device 230 may improve throughput based on performing the slow-start process from the adjusted CWND value (e.g., $2/3$ of the threshold CWND value).

In some implementations, proxy device 230 may detect a retransmission timeout and may set a CWND value to an initial CWND value (e.g., 10 MSS, 20 MSS, etc.). For example, proxy device 230 may detect a retransmission timeout (e.g., based on a quantity of unacknowledged traffic provided to user device 205), may set a CWND value to an initial CWND value, and may perform a slow-start process. In this way, proxy device 230 may limit a transmit rate based on detecting packet losses, thereby preventing additional packet losses and/or network congestion. Additionally, in this way, processor and/or memory resources associated with base station 210 and/or user device 205, and/or network resources may be conserved.

In some implementations, proxy device 230 may apply a parameter value to the second flow. In some implementations, proxy device 230 may implement an application buffer (e.g., a buffer that stores packets received from server device 240) to ensure that proxy device 230 stores a particular quantity of packets to provide to user device 205. In some implementations, proxy device 230 may detect that a quantity of packets, associated the application buffer, satisfies a threshold, and may increase an RWND value. In some implementations, proxy device 230 may be associated with multiple buffers. For example, proxy device 230 may be associated with a first buffer (e.g., a receive buffer) that may store packets that are received from server device 240. Additionally, or alternatively, proxy device 230 may be associated with a second buffer (e.g., a send buffer) that may store packets to be transmitted to user device 205. Additionally, or alternatively, proxy device 230 may be associated with a third buffer (e.g., the application buffer) that may store packets that have been received from server device 240 and that have been acknowledged (e.g., by proxy device 230).

In this way, proxy device 230 may control a transmit rate associated with server device 240 (e.g., based on adjusting an RWND value), and may independently control a transmit rate of proxy device 230 to user device 205 (e.g., based on adjusting a CWND value). In some implementations, proxy device 230 may receive packets from server device 240, and may store the packets in the third buffer (e.g., the application buffer). In this way, proxy device 230 may increase efficiency of the connection with user device 205 by providing user device 205 with a maximum quantity of packets that user device 205 may receive. For example, proxy device 230 may adjust the RWND value to increase a transmit rate associated with server device 240, thereby allowing proxy device 230 to maintain a threshold quantity of packets in the application buffer.

In some implementations, proxy device 230 may detect that a quantity of packets associated with the application buffer satisfies a threshold, and may increase an RWND value. Additionally, or alternatively, proxy device 230 may detect an increase in a CWND value, and may increase an RWND value. For example, proxy device 230 may maintain a particular ratio between a CWND value and an RWND value. In this way, proxy device 230 may allow server device 240 to increase a transmit rate towards proxy device 230. Additionally, in this way, proxy device 230 may maintain a threshold quantity of packets to provide to user device 205.

In some implementations, proxy device 230 may perform the action by instructing MME 215 and/or base station 210 to perform a handover procedure. For example, proxy device 230 may determine, based on respective condition information associated with base stations 210, that MME 215 and/or base station 210 should hand-off user device 205 to another base station 210 (e.g., a base station 210, of a neighboring cell and/or sector, that is associated with less congestion, more available resources, etc. as compared to a serving base station 210).

In some implementations, proxy device 230 may perform the action by instructing user device 205 to use particular RF carriers (e.g., in association with a carrier aggregation technique). For example, proxy device 230 may identify particular RF carriers (e.g., CCs) that are associated with particular congestion levels, and may provide an instruction to user device 205 to use the particular RF carriers.

In this way, implementations described herein enable proxy device 230 to perform actions in association with a first flow and/or a second flow based on condition information associated with user device 205 and/or base stations 210. In this way, proxy device 230 may more accurately estimate conditions associated with user device 205, base station 210, and/or a radio access network (RAN), and perform actions based on the conditions, thereby improving throughput, increasing efficiency of spectrum utilization, reducing packet loss, reducing download times, increasing the efficiency of a connection, and/or reducing network congestion. In this way, implementations described herein may conserve processor and/or memory resources of user device 205, base station 210, proxy device 230, and/or server device 240. Additionally, implementations described herein may conserve network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As described herein, network conditions may be more accurately determined in relation to when condition information is not received and used to determine network conditions. In turn, throughput may be more properly regulated. For example, a proxy device may refrain from throttling throughput when network congestion is not present (e.g., in a situation that mimics the signs of network congestion, such as radio signal degradation or signal weakness in a connection between a user device and a base station).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory, wherein the memory stores instructions; and
one or more processors, wherein the one or more processors executes the instructions to:
to:
   receive, from a user device, via a base station, a request to access a resource associated with a server device;
   receive, from the user device, via the base station, first condition information associated with the user device, the first condition information indicating at least one of:
      a distance between the user device and the base station,
      a signal quality value determined by the user device, or
      information regarding the resource;
   receive, from the base station, second condition information, different than the first condition information, associated with the base station,
      the second condition information indicating at least one of:
         a congestion level of the base station, or
         information associated with a flow between the user device and the base station;
   determine one or more actions based on:
      the first condition information, and
      the second condition information,
         determining the one or more actions including:
            determining a congestion window value based on the first condition information or the second condition information, or
            determining a receive window value based on the first condition information or the second condition information; and
   perform, in association with at least one of a first flow or a second flow, the one or more actions,
      the one or more actions including:
         applying the congestion window value to the first flow,
            the device to provide traffic to the user device based on the congestion window value, or
         applying the receive window value to the second flow,
            the device to obtain traffic from the server device based on the receive window value,
      the first flow being between the device and the user device, and
      the second flow being between the device and the server device.

2. The device of claim 1, where the one or more processors are further to:
determine the distance between the user device and the base station,
where the first condition information indicates the distance between the user device and the base station.

3. The device of claim 1, where the one or more processors are further to:
determine the signal quality value determined by the user device,
where the first condition information indicates the signal quality value determined by the user device.

4. The device of claim 1, where the one or more processors are further to:
cause the first flow and the second flow to be established based on the request; and
where the one or more processors, when performing the one or more actions in association with the first flow or the second flow, are to:
perform the one or more actions based on causing the first flow and the second flow to be established.

5. The device of claim 1, where the one or more processors, when performing the one or more actions, are to:
apply the congestion window value to the first flow.

6. The device of claim 1, where the one or more processors, when performing the one or more actions, are to:
apply the receive window value to the second flow.

7. The device of claim 1, where the one or more processors are further to:
determine third condition information associated with another base station;
compare the third condition information and the second condition information;
cause the user device to be handed off to the other base station based on comparing the third condition information and the second condition information; and
where the one or more processors, when performing the one or more actions, are to:
perform the one or more actions based on causing the user device to be handed off to the other base station.

8. A non-transitory computer-readable medium storing instructions, the instructions comprising:
one or more instructions that, when executed by one or more processors of a device, cause the one or more processors to:
determine first condition information associated with a user device,
the user device to receive a resource, from a server device, via a base station, and
the first condition information indicating at least one of:
a distance between the user device and the base station,
a signal quality value determined by the user device, or
information regarding the resource;
determine second condition information, different than the first condition information, associated with the base station,
the second condition information indicating at least one of:
a congestion level of the base station, or
information associated with a flow between the user device and the base station;
determine an action to be performed based on the first condition information and the second condition information, the determination including:
determination of a congestion window value based on the first condition information or the second condition information, or
determination of a receive window value based on the first condition information or the second condition information; and perform, in association with at least one of a first flow or a second flow, the action,
the action including:
application of the congestion window value to the first flow,
the device to provide traffic to the user device based on the congestion window value, or
application of the receive window value to the second flow,
the device to obtain traffic from the server device based on the receive window value,
the first flow being between the device and the user device, and
the second flow being between the device and the server device.

9. The non-transitory computer-readable medium of claim 8, where the one or more instructions, when executed by the one or more processors, further cause the one or more processors to:
receive information that identifies the congestion level of the base station; and
where the second condition information indicates the congestion level of the base station.

10. The non-transitory computer-readable medium of claim 8, where the one or more instructions, when executed by the one or more processors, further cause the one or more processors to:
determine the distance between the user device and the base station; and
where the first condition information indicates the distance between the user device and the base station.

11. The non-transitory computer-readable medium of claim 8, where the one or more instructions, when executed by the one or more processors, further cause the one or more processors to:
determine a location of the user device; and
where the one or more instructions, that cause the one or more processors to determine the action, cause the one or more processors to:
determine the action based on the location of the user device.

12. The non-transitory computer-readable medium of claim 8, where the one or more instructions, when executed by the one or more processors, further cause the one or more processors to:
determine a file size associated with the resource; and
where the one or more instructions, that cause the one or more processors to determine the action, cause the one or more processors to:
determine the action based on the file size.

13. The non-transitory computer-readable medium of claim 8, where the one or more instructions, when executed by the one or more processors, further cause the one or more processors to:
determine the signal quality value determined by the user device;
determine the congestion level of the base station; and
where the first condition information indicates the signal quality value determined by the user device and the second condition information indicates the congestion level of the base station.

14. The non-transitory computer-readable medium of claim 8, where the one or more instructions, when executed by the one or more processors, further cause the one or more processors to:
receive, from the user device, a request to access the resource associated with the server device;
cause a first connection to be established with the user device based on the request; and
cause a second connection to be independently established with the server device based on the request.

15. A method, comprising:
receiving, by a device and from a user device via a base station, a request to access a resource associated with a server device;
causing, by the device, a first connection to be established with the user device;
causing, by the device, a second connection to be established with the server device;
receiving, by the device, first condition information associated with the user device,
the first condition information indicating at least one of:
a distance between the user device and the base station,
a signal quality value determined by the user device, or
information regarding the resource;
receiving, by the device, second condition information, different than the first condition information, associated with the base station,
the second condition information indicating at least one of:
a congestion level of the base station, or
information associated with a flow between the user device and the base station;
determining, by the device, one or more actions to be performed based on the first condition information and the second condition information, the determination of the one or more actions including:
determination of a congestion window value based on the first condition information or the second condition information, or
determination of a receive window value based on the first condition information or the second condition information; and
performing, by the device, the one or more actions in association with at least one of a first flow or a second flow,
the one or more actions including:
applying the congestion window value to the first flow,
the device to provide traffic to the user device based on the congestion window value, or
applying the receive window value to the second flow,
the device to obtain traffic from the server device based on the receive window value,
the first flow being between the device and the user device, and
the second flow being between the device and the server device.

16. The method of claim 15, further comprising:
determining a position of the user device in relation to the base station; and
where determining the one or more actions comprises:
determining the one or more actions based on the position.

17. The method of claim 15, where performing the one or more actions comprises:
providing network traffic to the user device based on the congestion window value.

18. The method of claim 15, further comprising:
receiving third condition information associated with another base station;

comparing the third condition information and the second condition information;
causing the user device to be handed off to the other base station; and
where performing the one or more actions comprises:
performing the one or more actions based on causing the user device to be handed off to the other base station.

19. The method of claim 15, further comprising:
providing, to the user device, an instruction that causes the user device to use a particular set of carriers in association with the first connection based on the second condition information; and
where performing the one or more actions comprises:
performing the one or more actions based on the instruction.

20. The method of claim 15, further comprising:
determining that a quantity of packets associated with a first buffer satisfies a threshold,
a packet, of the quantity of packets, to be provided to the user device; and
increasing a receive window value associated with a second buffer based on determining that the quantity of packets associated with the first buffer satisfies the threshold.

* * * * *